United States Patent [19]
Foster et al.

[11] 3,761,887
[45] Sept. 25, 1973

[54] INTERVAL COUNTING CIRCUIT AND METHOD

[75] Inventors: Dennis L. Foster; James D. Hoeffel, both of Dayton, Ohio

[73] Assignee: Dayton Electronic Products Company, Dayton, Ohio

[22] Filed: Dec. 13, 1972

[21] Appl. No.: 314,827

[52] U.S. Cl. .................... 340/172.5, 328/109
[51] Int. Cl. ........ G06f 3/06, G06f 7/28, H03k 5/20
[58] Field of Search ............... 346/17; 324/113; 340/172.5; 328/109, 110; 307/232

[56] References Cited
UNITED STATES PATENTS

| | | | |
|---|---|---|---|
| R25,527 | 3/1964 | Floros | 340/172.5 |
| 2,991,452 | 7/1961 | Welsh | 340/172.5 |
| 3,019,350 | 1/1962 | Gauthey | 307/88.5 |
| 3,076,183 | 1/1963 | Willoughby | 340/174.1 |
| 3,114,900 | 12/1963 | Anderson | 340/182 |
| 3,153,776 | 10/1964 | Schwartz | 340/172.5 |
| 3,324,241 | 6/1967 | Bachelet | 179/8 |
| 3,327,226 | 6/1967 | Nourney | 328/109 |
| 3,380,020 | 4/1968 | Clark | 340/15.5 |
| 3,657,704 | 4/1972 | Boehm | 340/172.5 |

*Primary Examiner*—Paul J. Henon
*Assistant Examiner*—James D. Thomas
*Attorney*—Lawrence B. Biebel et al.

[57] ABSTRACT

Method and apparatus for transferring data pulses occurring within successive time intervals from one system to another, such as from a magnetic tape to a computer, by applying data pulses to an interval counter during each time interval, reading the contents of the interval counter to a buffer storage device upon receipt of a timing pulse, resetting the interval counter in preparation for receiving data pulses in the next time interval, employing a temporary storage counter to receive any data pulses occurring during the time data is transferred from the interval counter and it is reset, and transferring the contents of the temporary storage register to the interval counter. This method and apparatus prevents inaccurate counting of the total number of pulses received by insuring that data pulses are not missed or counted twice during the transition from one time interval to another.

4 Claims, 5 Drawing Figures

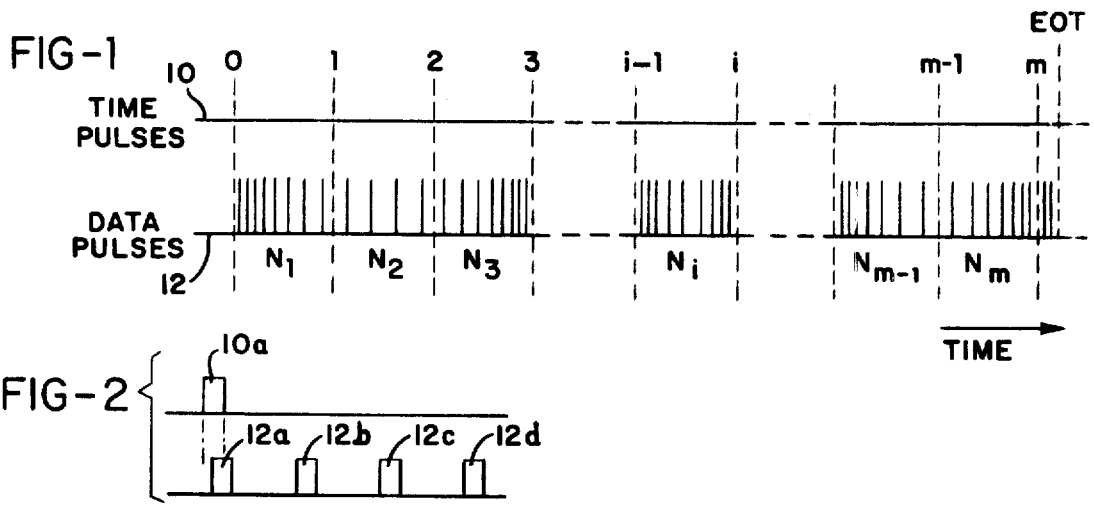
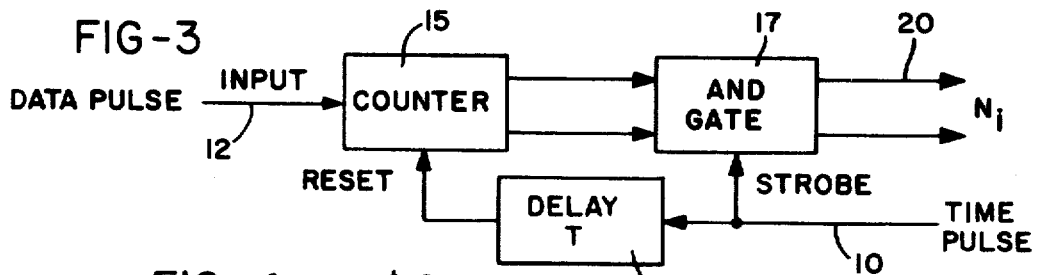
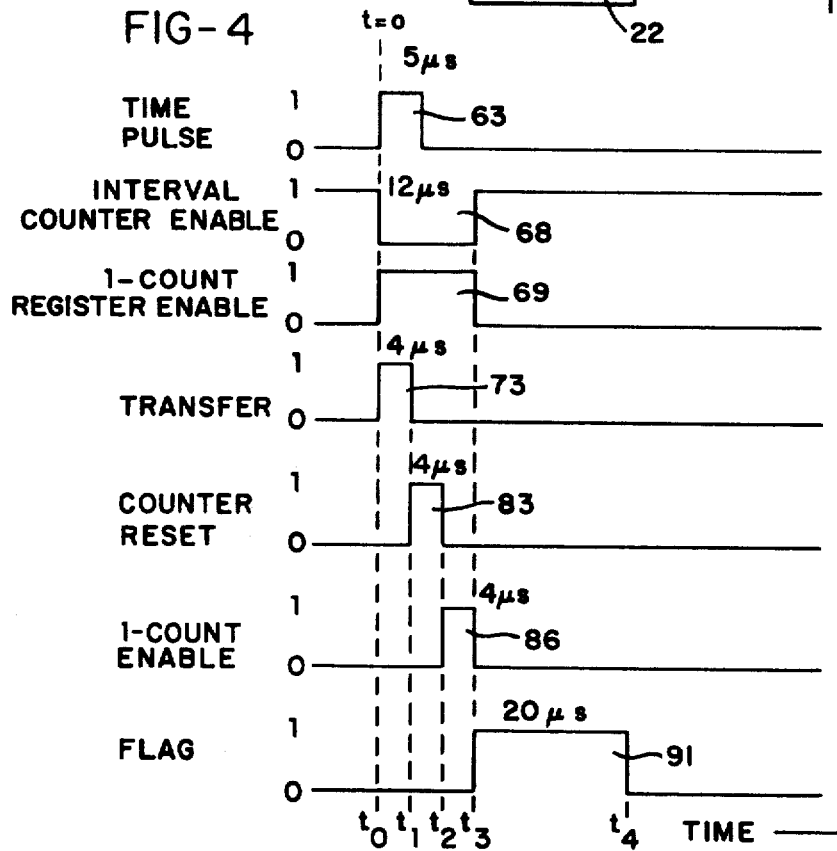

INTERVAL COUNTING CIRCUIT AND METHOD

BACKGROUND OF THE INVENTION

This invention relates to a method and apparatus for transferring digital information from a recording medium to a computer for analysis.

In power consumption measuring devices, such as those used to measure kilowatt hours, KVA, or current squared, all with respect to some time interval, a measured parameter may be displayed on visual dials and- /or placed on a recording medium, such as a magnetic tape as described in U.S. Pat. Nos. 3,148,329 and 3,673,607. The magnetic tape tape customarily has one track devoted to recording timing signals, and at least one, and usually three tracks for recording the measured parameters. The measuring instrument may include electrical switches actuated at a rate determined by the measured quantity, and these switches control electrical current to recording heads.

In a typical installation, the magnetic tape moves past the recording heads at a rate of approximately 7 to 12 inches per hour, with timing marks recorded on the tape at 15 minute intervals. The data pulses representing the measured parameter are typically recorded at a maximum rate of 6,000 pulses per hour, the spacing of these data pulses being a function of the measured parameter. On playback, the magnetic tape is moved at a much faster rate, typically in the order of 30 inches per second, thereby causing the timing pulses to be spaced 60 milliseconds apart, and the data pulses occurring at a maximum frequency of 25 kHz. Both the timing and data pulses are recorded in the non-return-to-zero mode, that is, current flows through the recording heads continuously in either the forward or reverse direction.

The number of pulses occurring in the interval between timing pulses is applied to a computer which analyzes the data. For example, the computer may provide a readout of the total number of time intervals recorded on the magnetic tape, the total number of pulses for each data track, and the time interval identification where the maximum number of data pulses occur. The computer determines the total number of data pulses by summing the pulses occurring within each time interval, and this number should agree (within a few pulses in $10^6$) with the total number of pulses as determined by simple mechanical pulse counters associated with the recording instrument.

One problem associated with this type of analysis is the possibility of dropping a pulse or even counting a single pulse in two time intervals during the time it takes to transfer data from the tape to the computer in response to each timing pulse. One proposed solution to this problem is to use two transfer devices, each sensing and transferring the data during alternate time intervals. This, of course, requires duplicate equipment, half of which is not usefully employed at any one time.

Interval counting would be a simple procedure if a data pulse never occurred in coincidence with a time pulse. In FIG. 1, the timing pulses are shown on line 10 as $0, 1, 2, 3, \ldots i-1, i, \ldots m-1, m$. Data pulses occurring within the time intervals are shown on line 12 with the number of data pulses occurring in the time interval 0 to 1 being represented by $N_1$, those occurring in the interval $i-1$ to $i$ being represented by $N_i$, etc. If $N_i$ represents the interval count for any $i$th interval, the total number of pulses X read in $m$ intervals is given by $$X = \sum_{i=1}^{m} N_i = N_1 + N_2 + N_3 + \ldots + N_m.$$

FIG. 3 shows a simplified apparatus for transferring data pulses to a computer upon the occurrence of each time pulse. The data pulses on input line 12 are applied to an interval counter 15 which accumulates the number of pulses received. When a time pulse on line 10 is received, this time pulse enables an AND gate 17 which then transfers the contents of the counter 15 to line 20 in machine readable form for a computer. The output $N_i$ of counter 15 may be in binary form. After a short time delay T, provided by delay circuit 22, the counter 15 is reset so that it may receive the next group of data pulses.

Two problem areas exist with the circuit shown in FIG. 3. The first problem is in the near simultaneous occurrence of a data pulse and a time pulse. This is represented in FIG. 2 where time pulse 10a occurs nearly simultaneously with a data pulse 12a. In this case, the counter 15 would attempt to count pulse 12a and reset at the same time. The second problem is in the determination of a suitable value for the delay time T so that the correct number $N_i$ is transferred from the counter 15 to the computer. If the time delay T is too long, pulses belonging in the $i-1$ interval may be counted in the ith interval, and when the counter is reset, these pulses would be lost. If time T is too short, a transient condition within the counter 15 may prevent the correct value of $N_i$ to be established before transferring the count to the computer, and therefore the count may be erroneous.

SUMMARY OF THE INVENTION

This invention relates to a device for receiving digital information, including data and timing pulses, and for transferring this information to a computer for analysis without losing or double counting any of the data pulses during the transferring interval.

This invention eliminates the above mentioned problems by using the following method and associated apparatus.

Upon the arrival of a time pulse, the counter is inhibited from further counting since the occurrence of a time pulse represents the end of the time interval. Next, the contents of the interval counter are transferred to buffer storage device to await interrogation by the computer. The interval counter is then reset in preparation for receiving the data pulses in the next time interval.

Where data pulses are not coincident with timing pulses, the next step would be simply to enable the interval counter to receive the data pulses. However, where a data pulse in the next time interval occur during the above sequence of operation, this data pulse would be missed unless some provision were made for sensing it. This invention uses a temporary storage register to sense the occurrence of any data pulse during this interval and to insert this pulse into the interval counter prior to the interval counter being enabled to receive pulses in the new time interval. Therefore, in this invention, the temporary storage register is enabled at the same time that the interval counter is inhibited, and the contents of the temporary storage register are transferred to the interval counter at the beginning of the next interval. The final step is to alert the the computer by means of a flag pulse that new data has been transferred into the buffer storage device.

It is therefore an object of this invention to provide an improved method and apparatus for interval counting as described above; to provide an apparatus for interval counting wherein a temporary storage counter is employed to receive and store data pulses during the transfer of the contents of a storage register to a buffer storage device, and for subsequently transferring the contents of the temporary storage register to the interval counter; to provide an apparatus which employs a one-count register as the temporary storage register; and to provide a method wherein an interval counter is inhibited from further counting upon receipt of a time pulse, transferring the contents of the interval counter to a buffer storage device to await interrogation by a computer, resetting the interval counter in preparation for receiving the data pulses in the next time interval, sensing the occurrence of and temporarily storing any data pulse during the time the interval counter is transferring data and resetting, and transferring the contents of the temporary storage register to the interval counter, and enabling the interval counter to receive data pulses in the next time interval.

Other objects and advantages of the invention will be apparent from the following description, the accompanying drawings and the appended claims.

BRIEF DESCRIPTION OF THE DRAWINGS

FIG. 1 is a timing chart showing the relationship between timing pulses and data pulses;

FIG. 2 is an expanded portion of the timing chart showing the occurrence of one data pulse nearly simultaneously with a timing pulse;

FIG. 3 is a block diagram of a simplified device for transferring data pulses to a computer for each time interval;

FIG. 4 is a timing chart showing the timing sequence used with an apparatus constructed according to this invention.

DESCRIPTION OF THE PREFERRED EMBODIMENT

Figure 5:
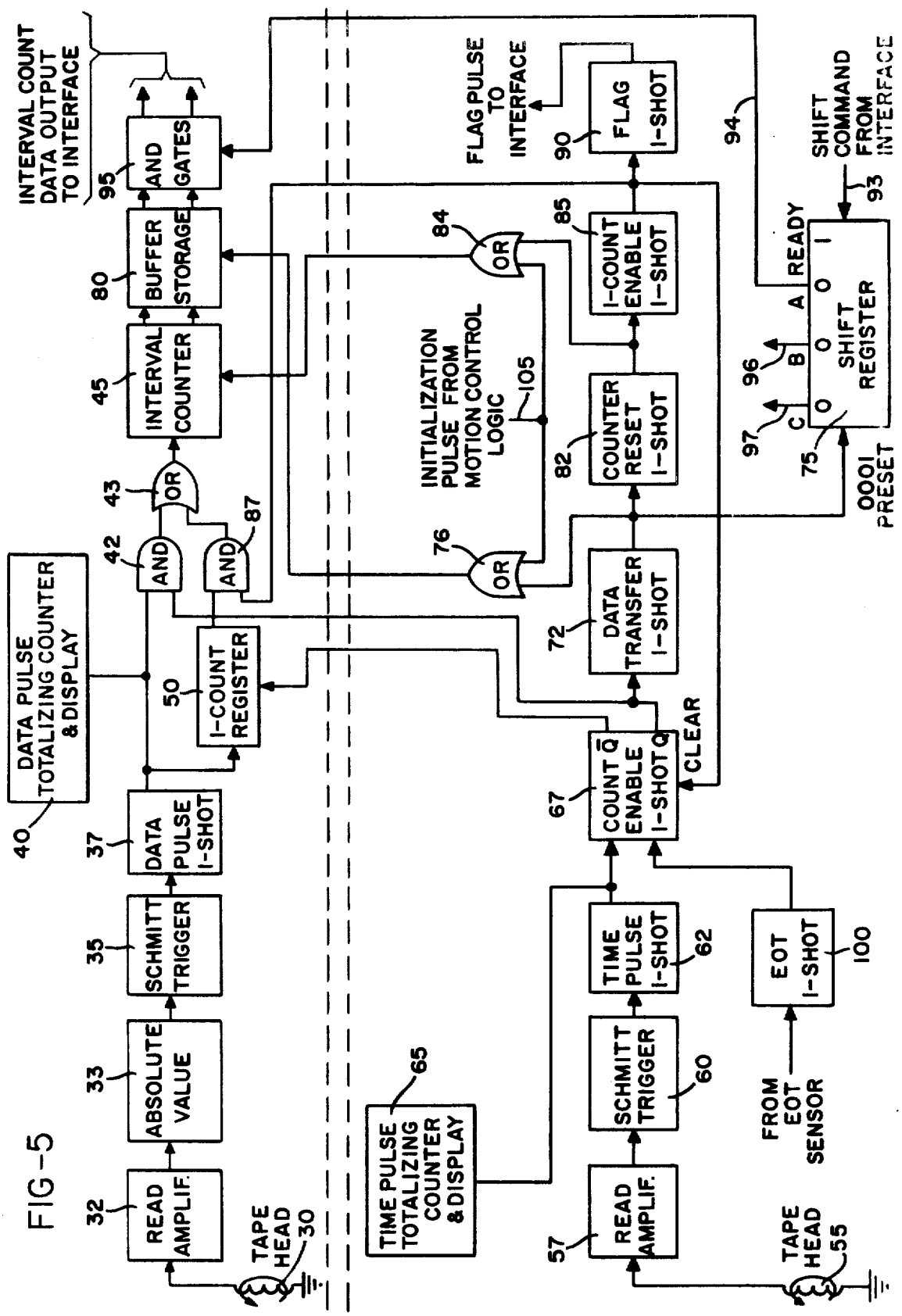
FIG. 5 is a block diagram of the invention.

Referring now to FIG. 5, which is a block diagram of the invention, the data pulses contained in one of the data tracks are sensed by a magnetic playback head 30. Typically, there are three playback heads and associated circuitry employed for the data channels when the invention is used to analyze information recorded by a power consumption device such as shown in the above mentioned U.S. Pat. No. 3,148,329.

The output of the playback head 30 is applied to a Read Amplifier 32 where it is amplified and applied to Absolute Value circuit 33. The Absolute Value circuit accepts inputs of either positive or negative polarity and provides a unipolarity output having a magnitude proportional to the magnitude of the input. Connected to the Absolute Value circuit is a Schmitt Trigger 35 having a threshold level set above the anticipated noise level on the tape so that the output of the Schmitt Trigger applied to Data Pulse One-Shot 37 represents only data pulses.

The Data Pulse One-Shot normalizes the output of the Schmitt Trigger and provides data pulses approximately five microseconds in duration, and these pulses are applied to a Data Pulse Totalizing Counter and Display device 40 and to a first AND gate 42, the output of which is applied through OR gate 43 to an Interval Counter 45. The output of the Data Pulse One-Shot is also applied to a temporary storage or One-Count Register 50.

Another playback head 55 is provided to sense the timing pulses found on the timing track of the magnetic tape. The head 55 is connected to a read amplifier 57, the output of which is applied directly to a Schmitt Trigger 60. Timing pulses are recorded on the magnetic tape by a cam actuated switch, and it is the closure of this switch which is usually regarded as the time pulse, and while the switch is subsequently opened, and therefore the current through the recording head will reverse, it is desired that only one reversal of current be detected and used as the timing pulse. In other words, only a change in current from the forward to reverse polarity, for example, will be used to represent the timing pulse and not the subsequent current change from reverse to forward polarity. Therefore, the timing channel does not require an absolute value circuit such as found in the data channels.

The output of Schmitt Trigger 60 is applied to a Time Pulse One-Shot 62, the output of which is a 5 microsecond time pulse 63, as shown in FIG. 4. The output of the Time Pulse One-Shot is applied to a Time Pulse Totalizing Counter and Display circuit 65 and to a Count Enable One-Shot 67.

The Count Enable One-Shot 67 has two complementary outputs. One output, represented by the waveform 68 in FIG. 4, is applied to AND gate 42. In FIG. 4, a 1 level signal is regarded as an enable while a 0 level signal is regarded as an inhibit. Therefore, at time *t*0, the output 68 of Count Enable One-Shot 67 enables AND gate 42, and therefore data pulses from the Data Pulse One-Shot 37 no longer are applied to the interval counter 45. As shown in FIG. 4, this disable signal 68 has a nominal twelve microsecond duration.

The complementary output of the Count Enable One-Shot 67 is shown by waveform 69 in FIG. 4, and this output enables the One-Count Register 50 for precisely the same time period that the Interval Counter 45 is disabled.

The leading edge of the time pulse 63 triggers Data Transfer One-Shot 72, and the output of this device is shown in FIG. 4 by the waveform 73. The output of one-shot 72 is applied to a Shift Register 75, the function of which will be described later, and through OR gate 76 to Buffer Storage 80. The data transfer pulse 73 is four microseconds in length and extends from time *t*0 to *t*1, and it is during this interval that the Buffer Storage 80 reads the contents of the Interval Counter 45.

The trailing edge of the data transfer pulse 73 is detected by Counter Reset One-Shot 82, the output of which is shown by waveform 83 in FIG. 4, and which has a 4 microsecond duration extending from time *t*1 to *t*2. The output of this one-shot is applied through OR gate 84 and causes the interval counter 45 to reset.

The trailing edge of waveform 83 triggers One-Count Enable One-Shot 85, the output of which is represented by waveform 86 in FIG. 4. This output is also four microseconds in duration and extends from time *t*2 to *t*3. The output of One-Count Eanble One-Shot 85 is applied to AND gate 87 and enables the contents of the One Count Register 50 to be transferred to the Interval Counter 45.

The Interval Counter 45 is enabled only after it has been reset and will receive any data pulse which occurs following time $t2$. Any data pulse which is generated during the time $t0$ to $t2$ will be stored by the temporary register or One Count Register 50 and then read into the Interval Counter during time $t2-t3$. Any data pulse occurring during time $t2$ to $t3$ will also be applied to the One Count Register 50, but this pulse will be transferred immediately to the Interval Counter 45. Any data pulse occurring after time $t3$ will be applied directly to the Interval Counter through AND gate 42.

Due to the maximum pulse repetition rate limitation applied to this particular system, only one data pulse might be present during the 12 microsecond interval where the Interval Counter is read and reset. In those situations where more than one data pulse might be received during this interval, the temporary storage register 50 could be a counter, and the Interval Counter 45 could be provided with a preset input.

The trailing edge of the one count enable pulse 86 clears the count enable one-shot 67, thus returning an enable to AND gate 42 to permit subsequent data pulses to be counted by the Interval Counter 45, and simultaneously disables the temporary storage register 50. Thus, the length of the output pulse from the Counter Enable One-Shot is equal to the total of the data transfer pulse 73, the counter reset pulse 83 and the one count enable pulse 86. For practical reasons, the Counter Enable One-Shot 67 is a one-shot multivibrator having a normal pulse width which exceeds 12 microseconds but which is able to be reset upon the application of a clear pulse, which, in the embodiment shown, is the trailing edge of the one count enable pulse 86. A bistable multivibrator could be used instead.

The trailing edge of the one count enable pulse 86 is also applied to a Flag One-Shot 90, the output of which is a twenty microsecond pulse 91 which is applied to the computer indicating that the Buffer Storage 80 now contains new information for analysis.

Referring now to the Shift Register 75, when the computer is ready to receive the information in the Buffer Storage 80, a shift command pulse is applied on input line 93 to place an enable on line 94 to AND gates 95, the output of which is applied as a binary number to the computer.

As mentioned previously, the present invention contemplates the use of three data channels, and therefore subsequent shift command pulses on line 93 from the computer will place an enable on lines 96 and 97 in sequence to enable an output from two other similar data channels. The shift register is preset by each timing pulse so that the data channels are read sequentially in the proper order.

Also shown in FIG. 5 is an End of Tape One-Shot 100 which responds to an output from an end of tape sensor, typically a photocell device associated with the tape, and this one-shot provides an end of tape signal similar to a timing pulse. This is necessary in order to read and transfer to the computer the data pulses in the last partial time interval.

When the invention is first turn on, but before the tape is moved to sense data and/or timing pulses, the Interval Counter 45 and the Buffer Storage 80 may contain a meaningless count. To eliminate this, an initialization pulse is applied on line 105 from a motion control logic circuit associated with the tape transport mechanism through OR gates 76 and 84 to reset the interval counter 45 and to transfer this zero count to the Buffer Storage 80.

The total number of pulses applied to the computer from the interval counter 45 will agree with the total pulses displayed on the totalizing counter and display device 40 through the use of the unique circuitry heretofore described. This is done in the present invention without using redundant interval counters, or complicated synchronizing circuits, and therefore provides a reliable and inexpensive means for transferring data pulses, interval by interval, to a computer accurately and efficiently.

While the method herein described, and the form of apparatus for carrying this method into effect, constitutes a preferred embodiment of the invention, it is to be understood that the invention is not limited to this precise method and form of apparatus, and that changes may be made in either without departing from the scope of the invention, which is defined in the appended claims.

What is claimed is:

1. Method for transferring data and timing information from a recording medium to a computer for analysis, said method including the steps of sensing data pulses recorded on the recording medium, sensing timing pulses also recorded on the recording medium, counting the number of data pulses occurring between timing pulses by an interval counter, momentarily inhibiting the receipt of data pulses by the interval counter upon the receipt of a timing pulse, transferring the contents of the interval counter to a computer for analysis, and resetting the interval counter in preparation for receiving the data pulses in the next time interval, sensing the occurrence of and temporarily storing in a temporary storage register any data pulse during the time the interval counter is transferring data and resetting, and transferring the contents of the temporary storage register to the interval counter at the beginning of the next time interval.

2. Apparatus for transferring data and time pulses from a recording medium to a computer for analysis, said recording medium having a timing track and at least one data track, said apparatus including means for sensing data pulses in said data track, means for sensing timing pulses in said timing track, an interval counter, a temporary storage counter, means for transferring data pulses from said data sensing means to said interval counter where said data pulses are counted in the interval between timing pulses, means for transferring the contents of said interval counter to a computer in response to said timing pulses, and means for directing data pulses to said temporary storage counter while said interval counter is transferring its contents to said computer and for subsequently applying any such data pulses to said interval counter following said transfer.

3. The apparatus of claim 2 wherein said temporary storage counter is a one count register.

4. Apparatus for transferring data and time pulses from a recording medium to a computer for analysis, said recording medium having a timing track and at least one data track, said apparatus including means for sensing data pulses recorded on a data track, means for sensing timing pulses recording on the timing track, an interval counter, means for transferring said data pulses to said interval counter where said data pulses are counted during the time interval between timing pulses, a buffer storage, means for transferring the data in said interval counter to said buffer storage in response to each timing pulse, means for resetting said interval counter upon completion of said transfer data to said buffer storage, a temporary storage counter, means for transferring any data pulse to said temporary storage counter during the transfer of data from said interval counter to said buffer storage, and means for transferring data in said temporary storage counter to said interval counter upon completion of the resetting of said interval counter.

* * * * *